US006871156B2

(12) United States Patent
Wallace et al.

(10) Patent No.: US 6,871,156 B2
(45) Date of Patent: Mar. 22, 2005

(54) SMART CONNECTOR PATCH PANEL

(75) Inventors: James P. Wallace, Kent, WA (US); Robert E. Millen, Federal Way, WA (US); Gerard V. Bohr, Fountain Valley, CA (US); Rodney A. Juelfs, Seattle, WA (US)

(73) Assignee: The Boeing Company, Chicago, IL (US)

( * ) Notice: Subject to any disclaimer, the term of this patent is extended or adjusted under 35 U.S.C. 154(b) by 14 days.

(21) Appl. No.: 10/426,420

(22) Filed: Apr. 30, 2003

(65) Prior Publication Data

US 2004/0220736 A1 Nov. 4, 2004

(51) Int. Cl.[7] ............................. G06F 19/00; G01B 7/16
(52) U.S. Cl. ......................... 702/127; 702/188; 73/787
(58) Field of Search .......................... 702/33, 127, 132, 702/104, 116, 42, 188, 130; 340/870.11; 73/760, 763, 769, 771, 772–773, 781, 786, 787

(56) References Cited

U.S. PATENT DOCUMENTS 6,608,566 B1 * 8/2003 Davis ..................... 340/870.11
6,735,630 B1 * 5/2004 Gelvin et al. ............... 709/224

OTHER PUBLICATIONS

Article, Automatic Calibration of Strain Gauges, Sensor Solutions, pp. 2–3; Jul. 1995.
Article, T–ID Identifier Module for Strain Gages, HBM, pp. 1–4.
Article, A Flexible Encapsulated MEMS Pressure Sensor System For Biomechanical Applications, pp. 55–62; Microsystem Technologies (2001); Springer–Verlag 2001.
Article, Strain Gauge Measuring Plate; MESSRING, pp. 1–9.
Article, SG–Link Wireless Strain Gauge System, Microstrain Microminiature Sensors, pp. 1–6, Nov. 2002 and Mar. 2003, http://www.microstrain.com/SG–Link.htm.

* cited by examiner

*Primary Examiner*—Evan Pert
(74) *Attorney, Agent, or Firm*—Harness Dickey & Pierce P.L.C.

(57) ABSTRACT

A system remotely collects test data from a test platform using platform attached sensors. Identification chips, each having a unique identification code, are each paired with an associated sensor to form sensor/chip pairs. At least one patch panel having a plurality of connections is positioned approximate to the platform. Connections are communicatively linked to each of the sensor/chip pairs. A computer system is communicatively linked to additional patch panel connections. The identification of selected sensors is queried by a computer command to the patch panels, and a group of sensors for a given test is identified and selected. Test data from each of the selected sensors is transferred through the patch panels to the computer system for collation and generation of a test setup compatible with a data acquisition system. Test setup information is downloaded to the data acquisition system in preparation for the next test.

36 Claims, 4 Drawing Sheets

SMART CONNECTOR PATCH PANEL

FIELD OF THE INVENTION

The present invention relates in general to data acquisition and more specifically to a system and method to selectively identify and collect data from one or more specific test devices.

BACKGROUND OF THE INVENTION

Test laboratories need to monitor several hundred (up to several thousand) strain gages and other test devices during structural qualification of aircraft, launch vehicles, or other types of structures. A data acquisition system is commonly used to collect and collate test data. To ensure proper data collection, the connection between each strain gage or device and the data acquisition system needs to be verified. This end-to-end verification requires significant amounts of schedule time and labor during the test critical path. The verification typically involves reading labels on strain gage cables, de-mating or shorting connectors, or shorting strain gages and observing information in the data acquisition system.

The disadvantage of individually reading labels on cables, de-mating or shorting connectors, or shorting strain gages to determine proper connections for the strain gages is amplified when many thousands of strain gages are used. Modern aircraft installations can require up to approximately 8,000 strain gages for structural testing. The time and labor to change out individual cables for specific individual tests requires verification of the connection at both the strain gage end and data acquisition end of the individual cable channels. Where selected quantities of the strain gages are required for individual tests, each channel (i.e. strain gage to data acquisition system connection) is typically shorted at one end of the cable and verified by an operator at the opposite end of the cable. Large amounts of test time as well as delays in construction and delivery schedule can result from the verification process for each of the channels required for an individual test.

It is therefore desirable to provide a system which can be remotely controlled, which can automatically identify individual strain gages or devices for an individual test, and which eliminates the need for testing each channel for continuity prior to a test.

SUMMARY OF THE INVENTION

According to a preferred embodiment of the present invention a system is provided to remotely collect test setup data from a mobile platform. A platform can range from one strain gage on a simple test coupon, to several hundred strain gages on a component test, or to several thousand strain gages on a major test. The system includes a plurality of identification chips each having a unique identification code, each chip individually paired with one of the sensors to form a plurality of sensor/chip pairs. A data acquisition system is linked to alternate ones of the connections of the patch panel.

The identification chips that are each associated with one of the sensors are provided with unique identification codes each having a multiple bit code formatted for digital transmission. By reading the identification code of the identification chips at the patch panel, the proper channel for each of the sensors connected to that patch panel can be identified. A remotely located computer can then signal a shunt resistor to close in the patch panel to select an individual channel to identify which path exists between a known sensor (identified by its identification code), through the patch panel into the data acquisition system. Light emitting diodes are also placed adjacent to each of the sensors and the connections on the patch panel such that a visual indication is provided at the patch panel and at the sensor to manually identify the location of the channel connector on the patch panel for an individual sensor.

A computer is connected to the patch panel to provide individual commands to the patch panel for identifying or selecting individual channels for test purposes. A network capable application processor is placed between the computer and the patch panel to decode the computer commands for direct use by the patch panel. The computer can be remotely located from the patch panel and the patch panel controlled via a network connection between the computer and the network capable application processor. Each patch panel is individually controlled within the panel by a field programmable gate array module. Multiple patch panels can be networked and controlled by the computer.

Further areas of applicability of the present invention will become apparent from the detailed description provided hereinafter. It should be understood that the detailed description and specific examples are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
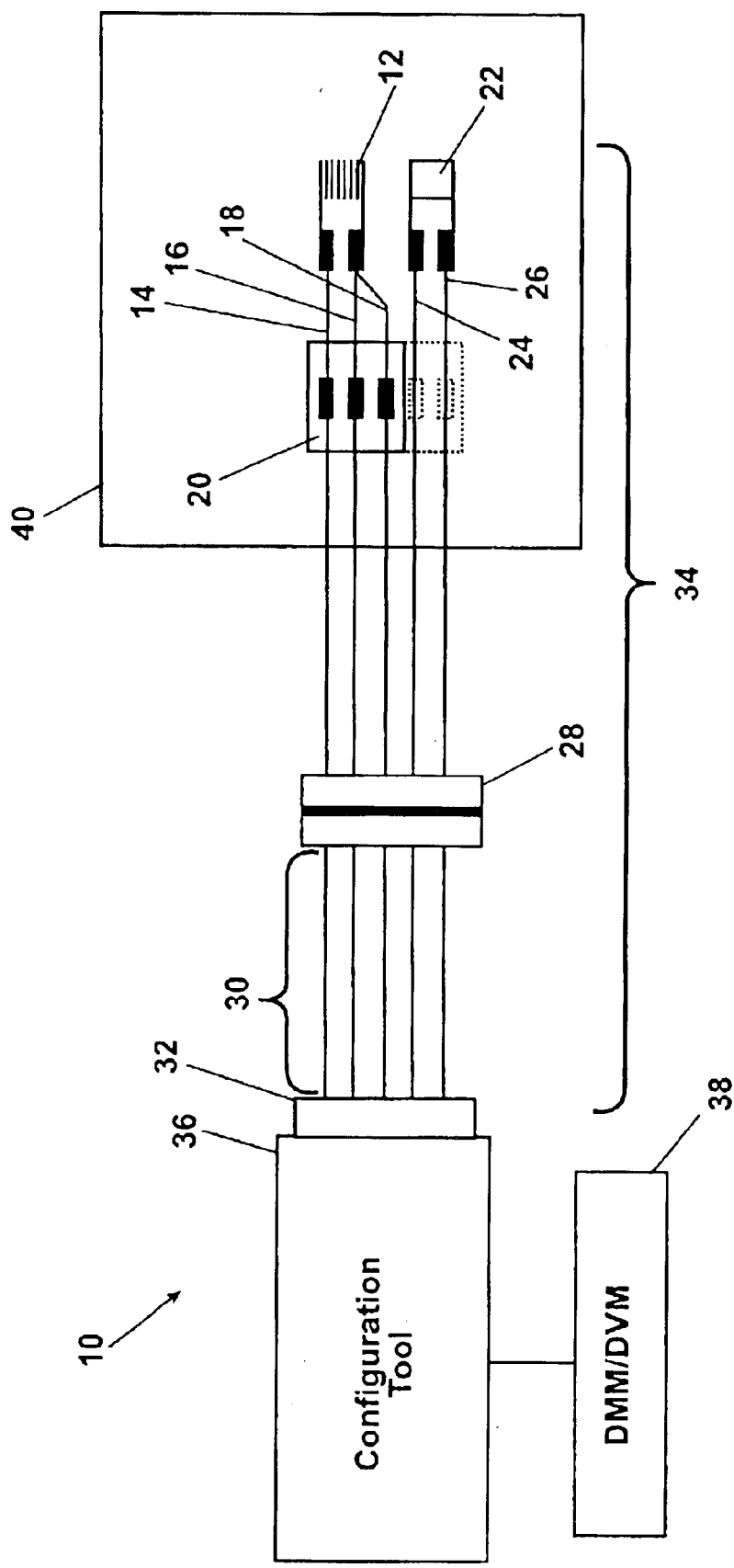
FIG. 1 is a diagram showing the configuration tool and a simplified portion of the present invention.

Referring to FIG. 1, a sensor system 10 includes at least one strain gage 12 having a first lead 14, a second lead 16, and a third lead 18 each connected to a common terminal strip 20 (e.g., by soldering). The first lead 14 typically provides current to the strain gage 12. The second lead 16 is the return path for the current from the strain gage 12. The third lead 18 from the strain gage 12 is a signal lead normally fed to signal conditioning equipment (not shown), where the output is read as the strain gage 12 output. Each strain gage 12 is provided with an associated identification chip 22. The identification chip 22 is known and includes a multi-bit, unique identification code or number which is assigned to the identification chip 22 when it is constructed. The unique identification code assigned to the identification chip 22 is a non-repeating code such that every identification chip 22 has a unique code assigned to it. The identification chip 22 can also be a memory chip such that additional data for the strain gage 12 can be identified thereon. The identification chip 22 is provided with a first identification (ID) lead 24 and a second ID lead 26. The first ID lead 24 and the second ID lead 26 may terminate at the terminal strip 20 depending upon the design of the identification chip 22.

Both the strain gage 12 and the identification chip 22 leads are commonly connected to an interface connector 28 located close to the strain gage. From the interface connector 28, the input and output to the strain gage 12 and the identification chip 22 are commonly provided in a short interface cable 30 connected to a configuration tool 36 during initial strain gage 12 installation and checkout. The interface cable 30 extends remotely from the position of the strain gage 12 and the identification chip 22 and terminates at a connector 32. Each of the components including the connector 32, the interface cable 30 and both the strain gage 12 and the identification chip 22 together form a channel 34. Multiple channels 34 can be used depending on the number of sensors required. In a preferred embodiment, the interface connector 28 and the connector 32 are RJ-45 connectors, known in the art, however, the invention is not limited to the connector type.

The connector 32 terminates at a configuration tool 36. The configuration tool 36 provides either a data input or output point for the identification chip 22 or a collection point for data from both the strain gage 12 and the identification chip 22. The configuration tool 36 is provided with manual connectors (not shown) for direct readout and recording of installed strain gage resistance and resistance to ground via a digital multi-meter/digital volt-meter 38, which can be recorded by the configuration tool 36. The configuration tool 36 can be a portable computer or similar device. Separate probes (not shown) can also be provided in the configuration tool 36 to locally read and record the data provided in the identification chip 22, the strain gage resistance, and resistance to ground at terminal strip 20. The strain gage 12 and the identification chip 22 are both normally connected to a platform 40 from which strain data is required. The configuration tool 36 can be positioned remote from the platform 40, or adjacent to the platform 40. The platform 40 can include any of a plurality of items requiring test data, including but not limited to, structures, fluid systems, vehicles, and air flow devices. The one or more strain gages 12 can also be replaced by other sensor types, including, but not limited to, pressure, flow, velocity, thermocouples, and acoustic sensors.

Figure 2:
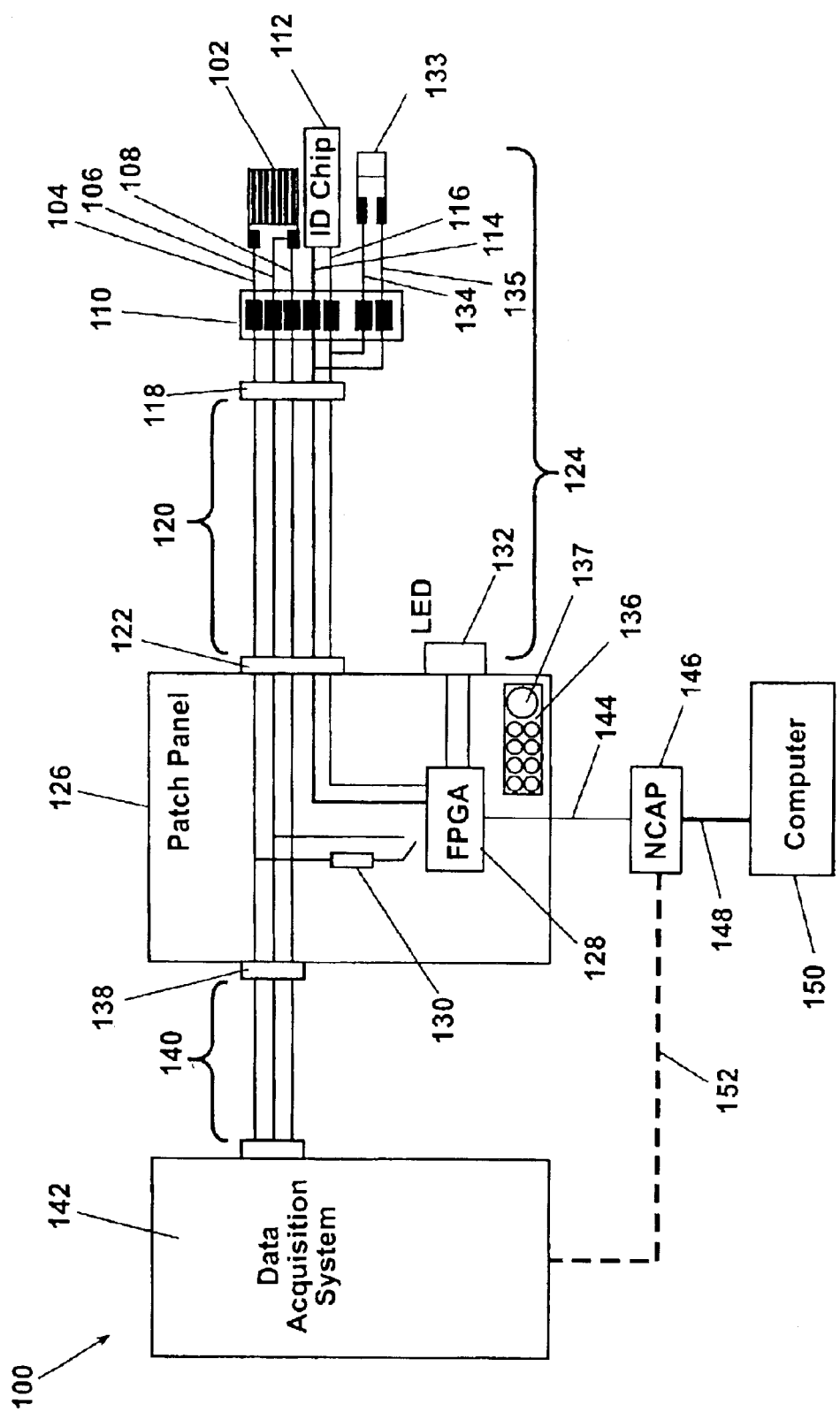
FIG. 2 is a diagram showing a strain gage connected to a patch panel of the present invention.

Referring now to FIG. 2, a patch panel sensor system 100 is shown. The patch panel sensor system 100 includes at least one strain gage 102 having a first lead 104, a second lead 106, and a third lead 108 connected to a terminal strip 110. At least one identification chip 112 is also provided for each strain gage 102. Each identification chip 112 includes a first ID lead 114 and a second ID lead 116. Both the first ID lead 114 and the second ID lead 116 are also connected to the terminal strip 110. A connector 118 joins all of the leads from the terminal strip 110 into a common assembly for routing through a cable 120. A distal end of the cable 120 includes a connector 122. Similar to the sensor system 10 of FIG. 1, each strain gage 102 and identification chip 112 together with the cable 120 and the connectors 118 and 122 form a channel 124. A plurality of channels 124 can be connected into a patch panel 126.

The connectors 122 are provided on a front face of the patch panel 126. On the rear of the patch panel 126, a corresponding number of connectors 138 are also provided. Each connector 138 provides a throughput connector for each of the channels 124. From each connector 138, one of a plurality of cables 140 transfers data to a data acquisition system 142. The patch panel 126 provides a normal, non-intrusive, three wire direct interface between each strain gage 102 and the data acquisition system 142. The patch panel 126 includes a plurality of the connectors 122 on a front face and the same number of output connectors 138 on the rear face of the patch panel. A preferred embodiment provides connectors for 32 channels of strain gages or sensors. In one embodiment of the present invention, the patch panel 126 has a width of approximately 48.3 cm (19 inches) and a height of approximately 5.1 cm (2 inches). Each of the connectors 122 and 138 are formed along a longitudinal row on the front and rear respectively, on the body of the patch panel 126.

Within the patch panel 126, a field programmable gate array module 128 is linked to each of the channels 124. The field programmable gate array module 128 acts as a decoder and receives signals from an external source for programming to or accessing data from the identification chip 112 from each of the channels 124. The patch panel 126 also includes a shunt resistor 130. The shunt resistor 130 is closed across strain gage first lead 104 and second lead 106 of channels 124 by commands given through the field programmable gate array module 128. When the shunt resistor 130 is closed across any of the channels 124, a voltage change is observed at the data acquisition system 142, verifying the connection between connector 138 of the patch panel 126 and the assigned input channel of the data acquisition system 142.

The patch panel 126 is also provided with a light emitting diode 132 for each of the channels 124. The purpose of the light emitting diode 132 is to provide a visual indication of the location on a particular patch panel 126 for one of the desired channels 124. Each channel 124 has a light emitting diode 133 connected across the first and second leads 114 and 116 of the identification chip 112. Each light emitting diode 133 is powered via a first diode lead 134 and a second diode lead 135. The light emitting diodes 132 and 133 for a select channel 124 will illuminate when selected by the field programmable gate array module 128, and the patch panel 126 also displays the channel number on a channel address indicator 136. Light emitting diodes 132 and 133 are used in part to make troubleshooting more efficient by providing a visual correlation of the patch panel input connector 122 and the corresponding strain gage on the platform 40 (shown in FIG. 1).

Depending upon the number of total channels required for a test, a plurality of patch panels 126 may be used. Each patch panel 126 therefore requires an identification code to uniquely identify each individual patch panel 126. The channel address indicator 136 in a preferred embodiment of the present invention provides a seven segment light emitting diode display to indicate a range of the channels provided by the patch panel 126. For example, an individual patch panel 126 may indicate that a channel range for exemplary channels 33 to 64 are provided by a particular patch panel. A selector switch 137 provides a manual means of changing the channel address indicator 136 to identify the particular range of channels provided by any one of the patch panels 126.

The field programmable gate array module 128 within the patch panel 126 is directed by instructions received via a data line 144 from a network capable application processor 146. The network capable application processor 146 includes a computer processor, an Ethernet connection, and a transducer bus controller. A network connection 148 connects the network capable application processor 146 to a computer 150. The computer 150 provides instructions for accessing individual channels 124, accessing any plurality of channels 124, and instructions to close the shunt resistor 130 via the field programmable gate array module 128. The code transmitted from the computer 150 is linked via the network capable application processor 146 to the field programmable gate array module 128, where the code is decoded for use. The computer 150 also typically stores information including a strain gage name, a strain gage factor, a strain gage transverse sensitivity, a strain gage resistance, a strain gage type and a strain gage lot number for each strain gage. Some of this information can also be provided in an identification memory chip (not shown) if an identification memory chip is used to replace the identification chip 112. The computer 150 can format all of the data from each of the strain gages 102 and identification chips 112 and provide a test setup for downloading to the data acquisition system.

Several functions of the data acquisition system 142 are to provide excitation to the strain gages 102, read the voltages from each of the strain gages 102, and to convert the strain gage voltage to engineering units. When hundreds or thousands of strain gages 102 are used for a particular test, the patch panel 126 provides to an operator of the data acquisition system an indication of which particular strain gage 102 is assigned to each of the channels 124 and the corresponding input channel number on the patch panel.

A data line 152 is shown in phantom in FIG. 2. The data line 152 provides another preferred embodiment of the present invention wherein the computer 150 is not used. Where a data acquisition system 142 is provided with sufficient capability, direct requests to identify individual channels 124 and to identify the code saved on individual identification chips 112 can be directed from the data acquisition system 142 through the network capable application processor 146 directly to the field programmable gate array module 128.

A plurality of patch panels 126 are used in a preferred embodiment of the present invention in order to provide the capability for configuring hundreds and up to thousands of individual strain gages 102. The network capable application processor 146 provides the capability to network each of the plurality of patch panels 126 via a plurality of data lines 144.

Using commands from the computer 150 through the network capable application processor 146, any individual strain gage 102 can be shunted by shunt resistor 130, and any individual identification chip 112 can be accessed. In addition, all of the channels 124 for a given patch panel 126 or all of the channels 124 for a plurality of patch panels 126 in a given test arrangement of identification chips 112 can also be simultaneously accessed and recorded and/or displayed in near-real-time on the computer 150. Similarly, any one channel 124, any group of channels 124 of a particular patch panel 126, or all of the channels 124 in a plurality of patch panels 126 in a given test arrangement can be shunted via the field programmable gate array module and the shunt resistor 130 in each patch panel 126.

Figure 3:
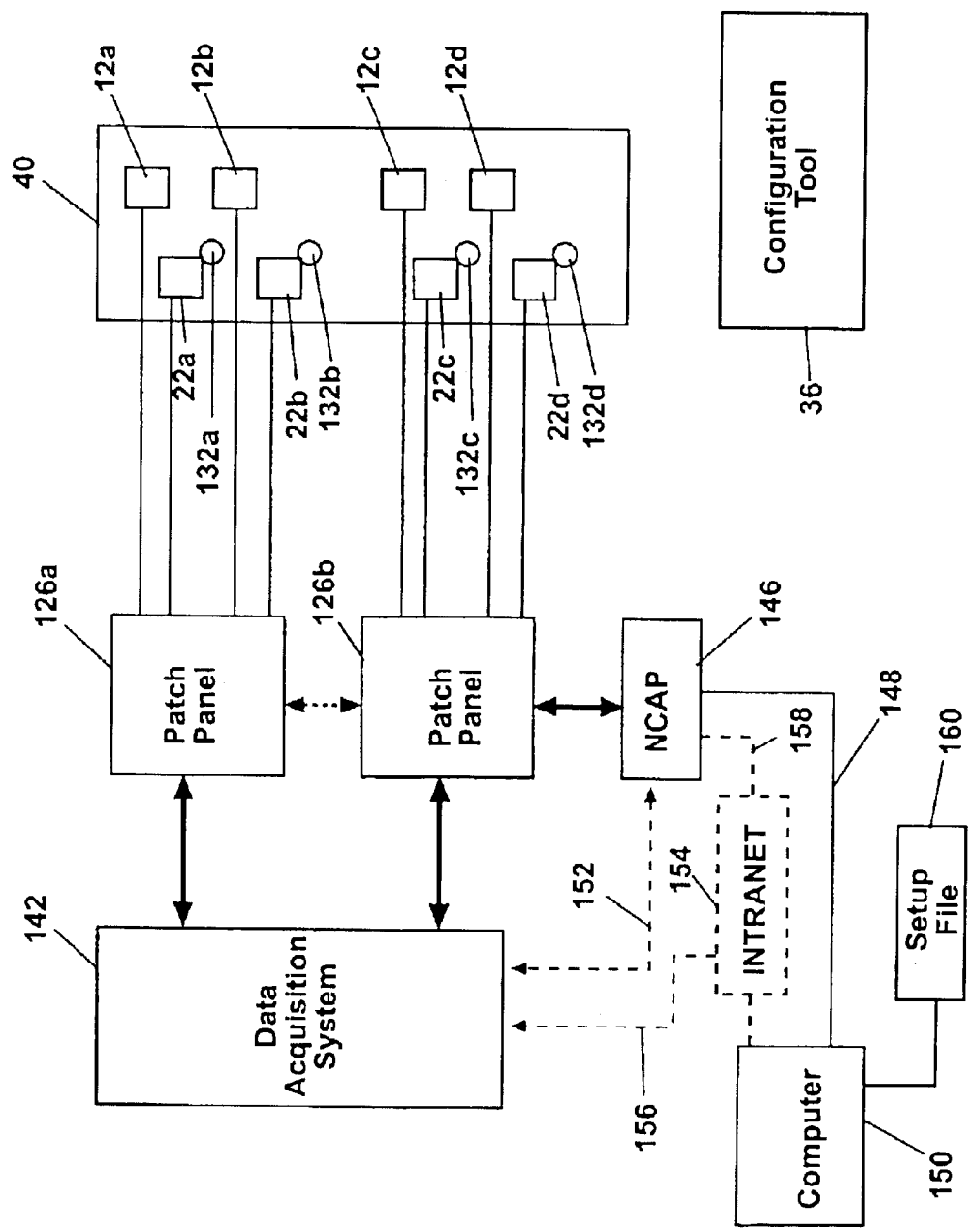
FIG. 3 is a diagram similar to FIG. 2, showing multiple patch panels networked together and the optional use of an Intranet connection.

Referring to FIG. 3, the arrangement of FIG. 2 is further detailed showing the interlinking of multiple patch panels 126a and 126b to the platform 40. The platform 40 has multiple strain gages 12a, 12b, 12c and 12d, each associated with an identification chip 22a, 22b, 22c and 22d, respectively, and a light emitting diode 132a, 132b, 132c and 132d, respectively. Commands from the computer 150 can optionally be routed through a user provided Intranet 154 to either the data acquisition system 142 via an Ethernet line 156 or to the network capable application processor 146 via an Ethernet line 158.

When all the necessary strain gages (e.g., 12a, 12b, 12c, 12d, etc.) are connected, a data system operator (not shown) can interact with the plurality of patch panels (126a, 126b, etc.) in an automated, systematic inventory of all strain gages (or sensors) in the system. The results of the inventory can be automatically transformed into a setup file 160 in a format suitable for downloading to the data acquisition system 142 via the Intranet 154 and the Ethernet line 156.

Figure 4:
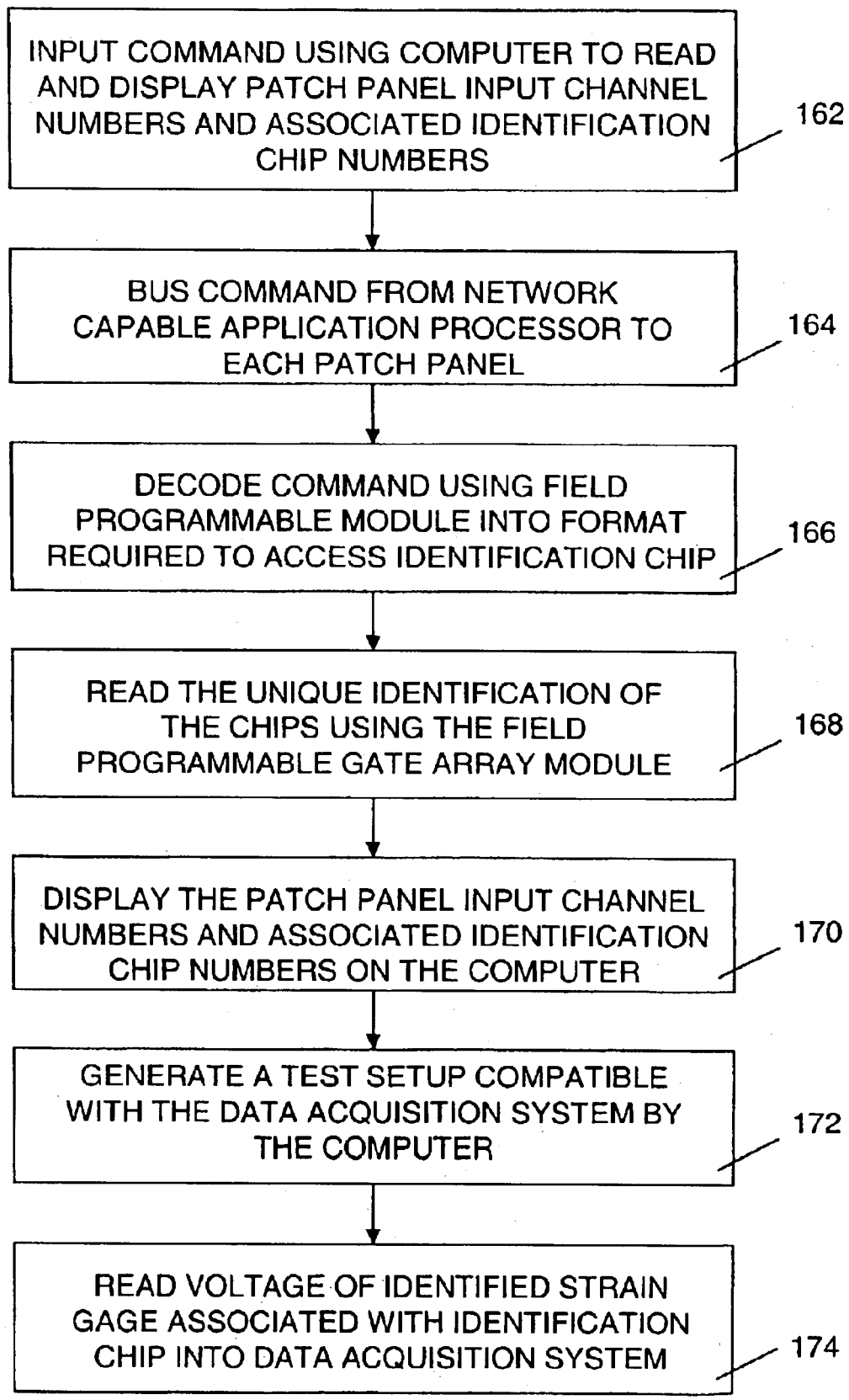
FIG. 4 is a block diagram showing the process to extract data from a strain gage/chip pair using a patch panel of the present invention to prepare the data acquisition system for test.

Referring now to FIG. 4, a sequence of steps is identified to access and record all patch panel input channel numbers and associated identification chips 112 for a plurality of patch panels 126 of the present invention. This data is formatted and downloaded for use by the data acquisition system. In a step 162, a command is input using a computer 150 to display all patch panel input channel numbers and their associated identification chip 112 numbers. In a step 164, the command is bussed from the computer to a network capable application processor and from the network capable application processor to each patch panel. In a step 166, the command is decoded using a field programmable gate array module in each patch panel into a format required to access the identification chips. In a step 168, the field programmable gate array module reads the unique identification number of the identification chips 112. In a step 170, the unique identification numbers of identification chips 112, and corresponding patch panel input channel numbers, are bussed from the field programmable gate array module in each patch panel to the network capable application processor, and from the network capable application processor to the computer, where the information is displayed and recorded to disk. In step 172, the computer integrates the previously entered information about each strain gage such as a gage number, gage factor, transverse sensitivity, gage resistance, gage type and gage lot number for each strain gage, and generates a test setup in a known format for downloading to the data acquisition system. In a final step 174, the test setup is downloaded to the data acquisition system via the Intranet to be used by the data acquisition system to acquire data on the next test.

As previously noted, the computer has the relationship of the patch panel output channel numbers and the corresponding data acquisition system input channel numbers. Also, the relationship between strain gages 102 and associated identification chips is previously established during initial strain gage installation using the configuration tool as shown in FIG. 1. This allows for the logical and automatic relationship between all strain gages 102 and their corresponding data acquisition style input channels to be established. This automatically completes verification of each strain gage installation, versus the commonly known, tedious and costly, end-to-end verification of each strain gage installation.

A patch panel 126 for accessing information from sensors of the present invention offers several advantages. By providing a patch panel 126 having multiple channel capability between a particular set of sensors (e.g., strain gages) and a data acquisition system 142, it is possible using the patch panel 126 to read the information associated with the individual strain gages to correctly provide a strain gage lineup for a particular test and transmit the individual strain gage data directly to the data acquisition system 142. Associating each strain gage or sensor with an identification chip having a unique identification number assigned to each chip provides the capability of uniquely identifying each strain gage or sensor. Providing a computer access to the patch panel permits software to be provided which can directly access the patch panel to query the particular channel location for any individual sensor or strain gage. Using a shunt resistor within the patch panel also remotely provides the capability of verifying a particular patch panel channel. Connecting to a particular data acquisition system input channel using a network capable application processor between the computer and the patch panel permits commands generated by the computer to be directly read into the patch panel. Light emitting diodes provided at both the location of each individual sensor or strain gage and the channel identification location on the patch panel provide a visual indication of a correct channel lineup between any individual sensor and the data acquisition system. The patch panel of the present invention permits existing data acquisition systems to remotely communicate with uniquely identified sensors.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system to remotely collect test data from a mobile platform comprising:
   a plurality of sensors attached to said platform;
   a plurality of identification chips each having a unique identification code and each paired with an associated one of said sensors to form a plurality of sensor/chip pairs;
   at least one patch panel having a plurality of connections, each of said connections directly connected to only one of said sensor/chip pairs; and
   a computer system communicatively linked to said connections of said patch panel and via said connections communicatively linked to said selected ones of said sensor/chip pairs.

2. The system of claim 1, wherein each of said identification codes comprises a multiple bit code formatted for digital transmission.

3. The system of claim 1, comprising a plurality of light emitting diodes, including:
   a first set of light emitting diodes each positioned adjacent to an associated one of said sensor/chip pairs; and
   a second set of light emitting diodes each positioned on said patch panel;
   wherein each one of said second set of light emitting diodes is paired with a select one of said first set of light emitting diodes such that a confirmation signal energizes both light emitting diodes of each pair.

4. The system of claim 1, wherein each of said sensors comprises a strain gage having at least three wire leads, including a first two of said three wire leads for a strain voltage transmission and a third wire lead for a signal output.

5. The system of claim 1, comprising:
   said computer system having at least a data storage component, a data analysis component, and a data transmission component; and
   said computer system communicatively linked to said patch panel via a network capable application processor;
   wherein said network capable application processor includes a decoder capable to decode commands transmitted from said computer system for transmission to said patch panel.

6. The system of claim 1, comprising:
   each said patch panel includes a plurality of data channels, each assignable to one of said sensor/chip pairs;
   each said channel having input and output connectors; and
   a channel selector to assign a unique range of said data channels to each said patch panel.

7. A component identification system comprising:
   a plurality of test components;
   a plurality of identification chips each having individualized test component identification data stored therein, and each cooperatively linked with an associated one of said test components to form a plurality of test component/identification chip pairs;
   at least one patch panel communicatively linked with said test component-identification chip pairs;
   each said patch panel includes a plurality of patch panel data channels, each assignable to one of said test component/identification chip pairs; and
   a computer system linked to said patch panel, said computer system having a database including identification and test setup data for each said component, said computer system being communicatively linked to said test component-identification chip pairs through said patch panel to operatively report a data set of each said component;
   wherein a unique range of said data channels is assignable to each said patch panel.

8. The system of claim 7, wherein each said patch panel further comprises a field programmable gate array module.

9. The system of claim 8, comprising a network capable application processor communicatively linked to said patch panel to operably control each said patch panel via said field programmable gate array module.

10. The system of claim 9, comprising said computer system being networked to said network capable application processor and having a plurality of processing functions, including each of:
    an identification chip individualized test component identification data retrieval function; and
    a patch panel activation function.

11. The system of claim 8, wherein
    each said channel includes at least one input connector and at least one output connector.

12. The system of claim 11, wherein said patch panel further comprises:
    a shunt resistor alignable across each said channel via said field programmable gate array module; and
    an output of said shunt resistor readable by said computer system.

13. The system of claim 11, comprising a plurality of light emitting diodes each energized to locate one of said channels on said patch panel.

14. A strain gage identification system, comprising
    a plurality of strain gages;
    a plurality of identification chips each having individualized strain gage identification data stored therein, and each cooperatively linked with one of said strain gages to form a plurality of strain gage/identification chip pairs;
    at least one patch panel having a plurality of connections, each connection being communicatively linked with only one of said strain gage/identification chip pairs; and a computer communicatively linked to said patch panel, said computer having a database including said individualized strain gage identification data and location data for each said strain gage, said computer being communicatively linked to said strain gage/identification chip pairs through said patch panel to operatively identify said individualized strain gage identification data.

15. The system of claim 14, further comprising:

each said patch panel including at least an input channel for each of said strain gage/identification chip pairs; and said computer operatively identifying an input channel number for each of said strain gage/identification chip pairs.

16. The system of claim 14, wherein each said patch panel further comprises:

a plurality of channels each assigned to one of said strain gage-identification chip pairs, each said channel having at least one input connector and at least one output connector; and a shunt resistor alignable across each said channel input connector and said channel output connector;

wherein a voltage drop across said shunt resistor verifies a connection between said computer, said patch panel, and one of said strain gage/identification chip pairs.

17. The system of claim 16, wherein said patch panel further comprises a field programmable gate array module controllably linked to said shunt resistor.

18. The system of claim 14, wherein said individualized strain gage identification data comprises at least one of the following:

a gage name;

a gage factor;

a transverse sensitivity;

a gage resistance;

a gage type; and a gage lot number.

19. A method to identify and collect data, using a computer, from a plurality of strain gages, each having a unique identification number, comprising the steps of:

inputting a computer command to access data from at least one of the strain gages;

bussing the command from the computer through a network capable application processor to a patch panel;

decoding the command with a field programmable gate array module into a format compatible with said unique identification number;

reading the unique identification number; and collecting strain gage data from the at least one strain gage in a data acquisition system.

20. The method of claim 19, comprising pairing each of the plurality of strain gages with one of a plurality of uniquely numbered identification chips to establish said unique identification number.

21. The method of claim 19, comprising disposing a plurality of input channels each having a unique input channel number for each of said strain gages in said patch panel.

22. The method of claim 21, comprising displaying corresponding ones of said unique input channel number and said unique identification number on said computer.

23. The method of claim 19, comprising storing individual strain gage identification data in the computer.

24. The method of claim 19, comprising selecting specific ones of said strain gages for a test.

25. The method of claim 19, comprising:

assigning each said strain gage to an individual data channel in a selected one of the patch panels;

signalling a shunt resistor in the selected patch panel to close; and verifying a data channel connection between a selected one of the strain gages and the selected patch panel by a voltage change across the shunt resistor.

26. The method of claim 19, comprising communicatively linking said computer to said data acquisition system.

27. The method of claim 26, comprising generating a test setup compatible with said data acquisition system.

28. The method of claim 27, comprising downloading said test setup to said data acquisition system.

29. The method of claim 19, comprising designating an individual range of operating channels for each said patch panel.

30. A system to remotely collect test data from a mobile platform comprising:

a plurality of sensors attached to said platform;

a plurality of identification chips each having a unique identification code and each paired with an associated one of said sensors to form a plurality of sensor/chip pairs;

a patch panel having a plurality of connections, selected ones of said connections communicatively linked to selected ones of said sensor/chip pairs;

a plurality of light emitting diodes divisibly positioned such that individual ones of said plurality of diodes are adjacent each of said sensor/chip pairs and said connections; and a computer system communicatively linked to said connections of said patch panel and via said connections communicatively linked to said selected ones of said sensor/chip pairs and said light emitting diodes.

31. The system of claim 30, wherein the plurality of light emitting diodes further comprises:

a first set of light emitting diodes each positioned adjacent to an associated one of said sensor/chip pairs; and a second set of light emitting diodes each positioned on said patch panel;

wherein each one of said second set of light emitting diodes is paired with a select one of said first set of light emitting diodes such that a confirmation signal energizes both light emitting diodes of each pair.

32. A system to remotely collect test data from a mobile platform, comprising:

a plurality of sensors attached to said platform;

a plurality of identification chips each having a unique identification code and each paired with an associated one of said sensors to form a plurality of sensor/chip pairs;

at least one patch panel having a plurality of connections, selected ones of said connections communicatively linked to selected ones of said sensor/chip pairs;

each said patch panel includes a plurality of data channels, each assignable to one of said sensor/chip pairs;

each said channel having input and output connectors;

a channel selector operable to assign a unique range of said data channels to each said patch panel; and a computer system communicatively linked to said connections of said patch panel and via said connections communicatively linked to said selected ones of said sensor/chip pairs.

33. A component identification system comprising:
a plurality of test components;
a plurality of identification chips each having individualized test component identification data stored therein, and each cooperatively linked with an associated one of said test components to form a plurality of test component/identification chip pairs;
at least one patch panel communicatively linked with said test component-identification chip pairs;
each said patch panel including a field programmable gate array module; and
a computer system linked to said patch panel, said computer system having a database including identification and test setup data for each said component, said computer system being communicatively linked to said test component-identification chip pairs through said patch panel to operatively report a data set of each said component.

34. A component identification system, comprising:
a plurality of test components;
a plurality of identification chips each having individualized test component identification data stored therein, and each cooperatively linked with an associated one of said test components to form a plurality of test component/identification chip pairs;
at least one patch panel communicatively linked with said test component-identification chip pairs;
each said patch panel including a field programmable gate array module;
a plurality of channels each assigned to one of said test component-identification chip pairs;
a shunt resistor alignable across each said channel via said field programmable gate array module and operable to close any one of said channels; and
a computer system linked to said patch panel, said computer system having a database including identification and test setup data for each said component, said computer system being communicatively linked to said test component-identification chip pairs through said patch panel to operatively report a data set of each said component.

35. A strain gage identification system, comprising:
a plurality of strain gages;
a plurality of identification chips each having individualized strain gage identification data stored therein, and each cooperatively linked with one of said strain gages to form a plurality of strain gage/identification chip pairs;
at least one patch panel communicatively linked with said strain gage/identification chip pairs;
a computer communicatively linked to said patch panel, said computer having a database including said individualized strain gage identification data and location data for each said strain gage, said computer being communicatively linked to said strain gage/identification chip pairs through said patch panel to operatively identify said individualized strain gage identification data;
a plurality of channels each assigned to one of said strain gage-identification chip pairs, each said channel having at least one input connector and at least one output connector; and
a shunt resistor alignable across each said channel input connector and said channel output connector;
wherein a voltage drop across said shunt resistor verifies a connection between said computer, said patch panel, and one of said strain gage/identification chip pairs.

36. A method to identify and collect data, using a computer, from a plurality of strain gages, each having a unique identification number, comprising the steps of:
inputting a computer command to access data from at least one of the strain gages;
bussing the command from the computer through a network capable application processor to a patch panel;
designating an individual range of operating channels for each said patch panel;
reading the unique identification number; and
collecting strain gage data from the at least one strain gage in a data acquisition system.

\* \* \* \* \*